United States Patent
Ross

[15] 3,638,093
[45] Jan. 25, 1972

[54] MAGNETIC SUSPENSION AND PROPULSION SYSTEM

[72] Inventor: James A. Ross, La Jolla, Calif.

[73] Assignee: Rohr Corporation, Chula Vista, Calif.

[22] Filed: Apr. 19, 1971

[21] Appl. No.: 131,041

[52] U.S. Cl. ........................318/687, 318/135, 310/12, 308/10, 104/148
[51] Int. Cl. .................................................H02k 41/04
[58] Field of Search .......................310/12–14, 162–164; 318/687, 135, 121; 104/148, 148 LM, 148 NS, 89; 308/10

[56] References Cited

UNITED STATES PATENTS

| | | | |
|---|---|---|---|
| 408,465 | 8/1889 | Dewey | 308/10 |
| 714,851 | 12/1902 | Albertson | 310/13 X |
| 833,635 | 10/1906 | Royers | 308/10 X |
| 1,020,942 | 3/1912 | Bachelet | 310/14 |
| 1,020,943 | 3/1912 | Bachelet | 310/13 |
| 2,870,349 | 1/1959 | Rosenberg et al. | 310/13 |
| 3,125,964 | 3/1964 | Silverman | 104/89 |
| 3,158,765 | 11/1964 | Polgreen | 318/135 X |
| 3,243,238 | 3/1966 | Lyman | 308/10 |
| 3,407,749 | 10/1968 | Frig. | 318/135 X |
| 3,456,136 | 7/1969 | Pierro | 310/12 |
| 3,470,828 | 10/1969 | Powell, Jr. et al. | 310/13 X |

FOREIGN PATENTS OR APPLICATIONS

| | | |
|---|---|---|
| 644,302 | 4/1937 | Germany |
| 707,032 | 6/1941 | Germany |
| 1,537,842 | 7/1968 | France |
| 1,165,704 | 10/1969 | Great Britain |
| 1,228,004 | 4/1971 | Great Britain |
| 643,316 | 4/1937 | Germany ..................104/148 MS |

*Primary Examiner*—D. F. Duggan
*Attorney*—Harry R. Lubcke

[57] ABSTRACT

A method and apparatus for supporting and translating a mass by magnetic attractive means. A ferromagnetic track may have repetitive magnetic discontinuities. A linear plural-phase ferromagnetic electric motor, which may be synchronous, supports the mass at a small gap below the track at zero frequency current variation through the motor. The same motor translates the mass along the track at a speed determined by the frequency of the plural-phase alternating current supplied to the motor. A nonlinear feedback circuit having plural sensor elements controls the magnitude of the alternating current supplied to the motor. This maintains the gap substantially constant despite varying loads and gradually corrects for unevenness of the track. The feedback circuit provides uniform stability and uniform dynamic response regardless of the length of the gap.

34 Claims, 10 Drawing Figures

MAGNETIC SUSPENSION AND PROPULSION SYSTEM

BACKGROUND OF THE INVENTION

This invention pertains to a method and means for accomplishing controlled support and motion of a mass by electrically produced magnetic means.

Prior systems have provided magnetic support for a wide range of devices, from gyroscope and ultracentrifuge bearings to railway cars upon a track. For railway cars magnetic repulsion has frequently been employed, with a stationary structure below, a supported structure above, and a magnetic flux gap between.

In order to obtain a constant force with displacement characteristic suitable for known linear feedback circuits, a second magnetic means has often been positioned below the supported structure. Feedback is required to keep the supported structure properly related to the stationary structure below it. Such two-gap structures are applicable to rotational magnetic devices, such as gyroscopes and ultracentrifuges.

Prior single-gap structures have used linear feedback and have had restricted ranges of gap variation over which the system can be stable. Again, these are applicable to ultracentrifuges or accelerometers, which do not require large ratios of gap variation.

Magnetic propulsion has been proposed and employed having a pair of ferromagnetically related windings astride a stationary rail conductor in which eddy currents are produced. Such a propulsion system typically employs aircushion support and guidance for the vehicle and in some cases an air bearing for close control of the air gaps between the motor and the reaction rail.

Other propulsion systems have required a large plurality of stationary coils in the roadway, with superconducting electromagnets in the vehicle which traverses it, or a large plurality of permanent magnets in both the roadway and the vehicle. This accomplishes suspension, but other means are required for propulsion. Even further arrangements have proposed electromagnetic support but employ air propulsion; as with a propeller or jet element upon the vehicle, or pneumatic means to force the vehicle through an airtight tube.

For vehicular transportation the degree of stability of the vehicle with respect to the track is important, as in the compensation for varying weight upon discharging passengers, varying thrust due to wind, and the smoothness of the ride. The latter depends upon the dynamic response of the system over the whole range of airgap. The showings of the prior art in these important respects have been highly fragmentary or nonexistent.

SUMMARY OF THE INVENTION

A mass is supported and advantageously also propelled by a single attractive magnetic field. This may be a vehicle arranged to run along a two spaced rail way and employing four (or more) wound linear motors, which are a part of the mass. Two of the motors are coactive with each rail by suspension below the same. Alternately, a monorail way with two or more aligned motors may be used.

The rail is ferromagnetic. Typically, it has repetitive magnetic discontinuities to allow propulsion by variable reluctance.

A linear motor has a ferromagnetic core, with plural-phase windings in slots. The motor extends over plural magnetic discontinuities in the rail.

A nonlinear feedback circuit includes a first sensor element sensing the length of the gap between the motor and the rail and a second sensor element sensing the acceleration with which changes in this length may occur. Also included is an integrator that is connected to the gap sensor. The output of the integrator, along with the electrical response of the acceleration sensor element, are processed through a square-rooter electrical element, and then through an electrical differentiator. In parallel with the electrical differentiator, a multiplier forms the product of the instantaneous displacement and the square-rooter output. This output controls the current in the plural-phase windings of the motor.

This feedback circuit provides feedback gain that is substantially constant with respect to the length of the gap. Moreover, this constancy of gain is substantially unaffected by changes in the frequency of the plural-phase alternating current which drives the vehicle at a speed proportional to that frequency.

The feedback circuit maintains the gap substantially constant despite varying loads and gradually corrects for unevenness of the track. Importantly, the stability of the vehicle upon the track and the dynamic response of the control is uniform regardless of the length of the airgap. The feedback circuit also maintains lateral stability and any lateral perturbation is restored in a damped manner without overshoot.

The essentials of the system; the rails and particularly the linear motors, are relatively lightweight and inexpensive. A saving in weight by a factor of two or better is achieved in the vehicle, since one set of movable ferromagnetic members provide both support and propulsion.

Dynamic regenerative braking is inherently a part of the system. The motors act as generators when excited with voltage of retarded phase.

Any factor of magnetic drag such as is encountered in magnetic repulsion systems is absent. The combined suspensive and propulsive motor provides propulsion. This, of course, is the opposite of drag.

Cryogenic apparatus for superconducting elements or elaborate conductors in the pathway are not required; an obvious simplification.

An alternate structure, with windings in the track, provides power to operate the vehicle through the magnetic field interacting with that of the motors. This arrangement makes sliding power pickups unnecessary.

A further alternate structure, with squirrel-cage conductive bars or an equivalent conductive sheet in the track, allows propulsion by the induction motor process.

A still further alternate structure employs a uniform ferromagnetic rail and attains propulsion by hysteresis in the rail.

DESCRIPTION OF THE PREFERRED EMBODIMENTS

Figure 1:
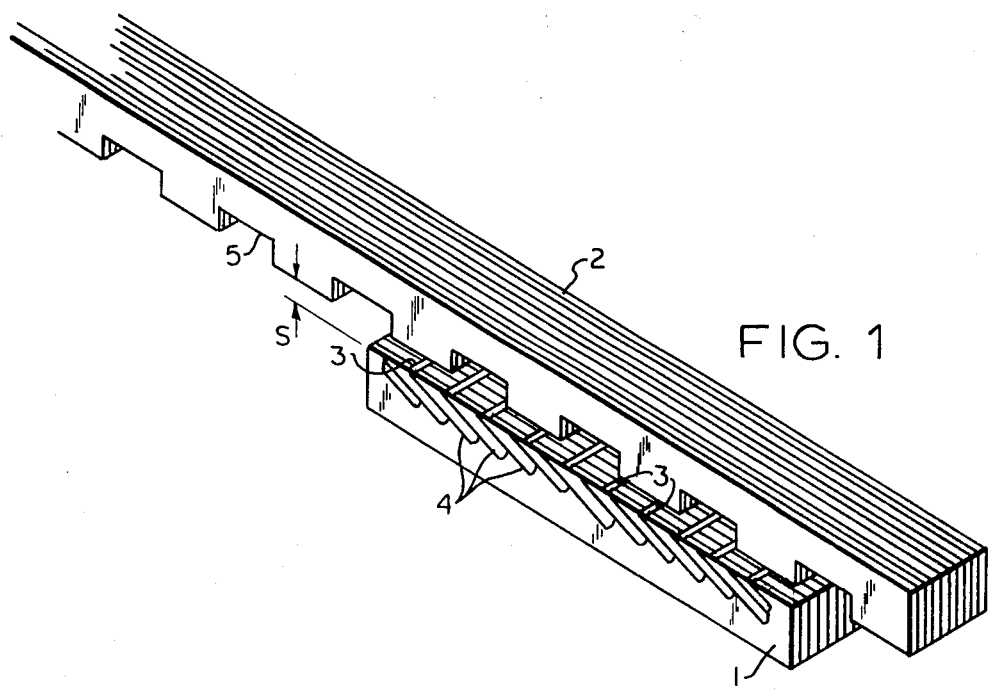
FIG. 1 is a perspective view of one linear motor in suspended relation to a coactive rail.

FIG. 1 shows the essentials of the suspension and propulsion aspects of this invention. Motor 1 is comprised of a plurality of linearly shaped magnetic quality ferromagnetic stampings similar to those employed for known rotary electric motors. These are held in a bundle by known means, such as bolts, not shown. A plurality of transverse slots 3 are formed in the upper part of all of the laminations. In the slots are placed a plurality of coils 4. Plural-phase electrical energy flowing in a plural-phase conductive structure is typical for this invention. For purposes of illustration and description three phases will be used.

Each coil may have several turns. The winding pitch is equal to the pole pitch on rail 2. A pole consists of one slot 5 and an adjacent "land." This represents a successive magnetic discontinuity along the rail. In one embodiment the pole pitch is 5 inches. The slot is consequently 2½ inches long. Three sets of series-connected windings for phases A, B and C are provided in the motor.

Other compromises between lifting force and propulsion force may be used. The greater the land area the greater will be the lifting force, at the expense of the propulsion force. The lifting force is one of attraction between the motor and the rail and is energized by the sum of the currents in all of the coils. The propulsion force utilizes the difference in reluctance of the paths from the motor into the rail through the land as compared to that through a slot 5. When the current distribution in the three phases of coils changes because of the variation with time of three-phase alternating current electricity, the position of stable magnetic equilibrium is altered and the motor moves correspondingly in order to preserve an overall path of minimum reluctance. There are three-coil slots 4 in the distance of one pole on the rail. The coils for phases A, B, and C progress in order down the structure of the motor.

Typically, the rail is longitudinally laminated similar to the motor and may have the same or a somewhat reduced width. Such lamination reduces eddy current losses in the rail; thus less loss reflected into, and therefore supplied by, the motor.

Minor variations of the rail structure may be employed. The rail may be notched or unnotched and provided with a plate of aluminum conductors to operate as a squirrel-cage induction motor. The rail alone may be used, unnotched, and then the motor-rail combination acts as a hysteresis motor.

As is considered later, a minimum of two motors 1 is employed for a suspended-vehicle monorail arrangement and a minimum of four motors for a two rail vehicle-over-the-rails arrangement. Suitable nonmechanically interfering brackets are provided to support the rail or rails. For a monorail the vehicle may be suspended directly below the motors. For a two rail track the motors are attached to C-shaped brackets to place the motors below the rail while the vehicle body is above the rail.

The contact between the usual railroad wheel and the railroad rail is only a transverse line. The effective "contact" between motor 1 and rail 2 may be as much as 3 feet. Thus, rail 2 need be only a fraction as stiff as a railroad rail in order to carry the same load.

Figure 2:
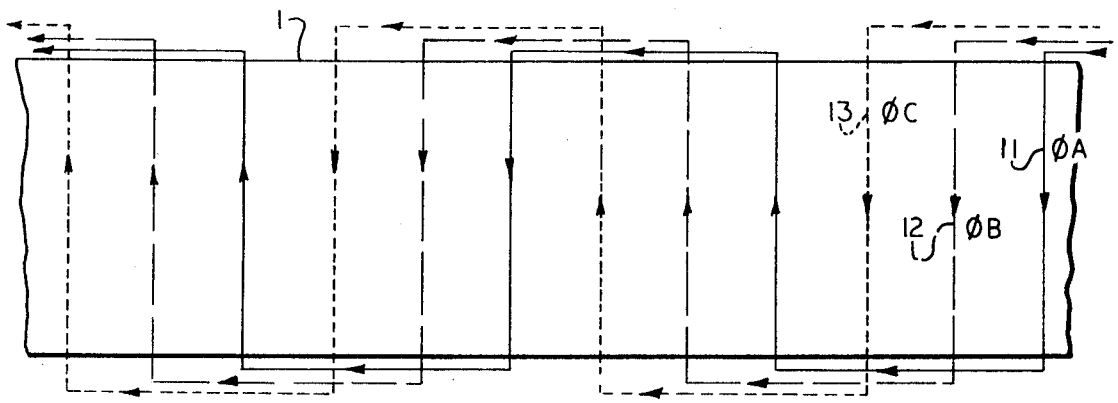
FIG. 2 is a schematic plan view of a motor, showing plural-phase windings thereof.

FIG. 2 is a schematic plan view of the upper side of motor 1, showing the scheme of winding for the plural-phase coils.

The coils were generically indicated at 4 in FIG. 1. In FIG. 2 these are subdivided into coil 11, shown as a full line, for $\phi A$; coil 12, shown as a dashed line, for $\phi B$; and coil 13, shown as a dotted line, for $\phi C$. Each of these coils may have several turns before passing down the motor frame to the next position in the slots as shown. One embodiment employs 144 turns of No. 12 AWG wire for each coil. The winding scheme is of the series type.

Figure 3:
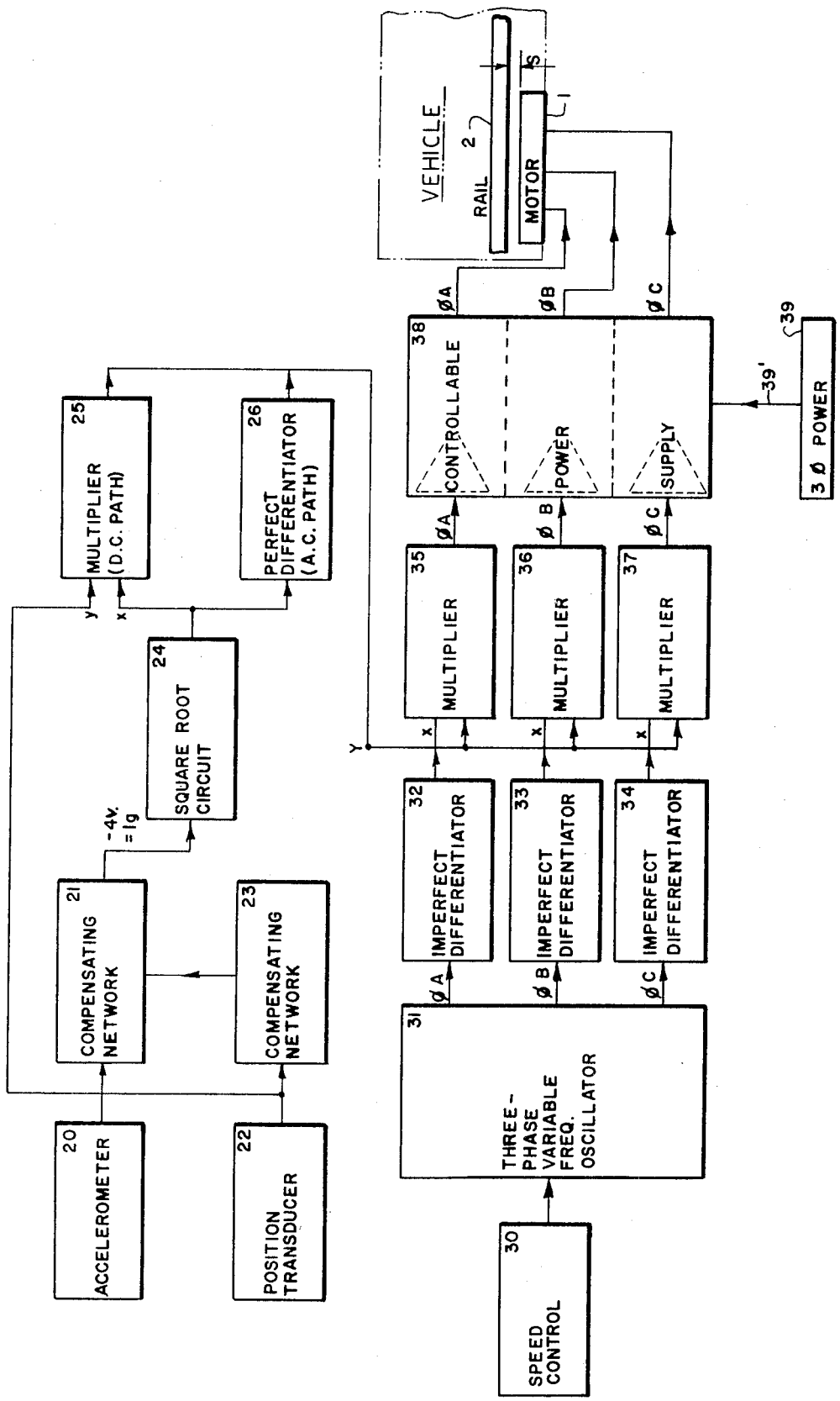
FIG. 3 is a block diagram of the complete electrical system, including motor, sensor elements and the feedback circuit.

FIG. 3 is a block diagram of the complete electrical system, including the motor, sensor elements and the feedback circuit.

The feedback circuit is nonlinear in order to compensate for the nonlinearity of the motor characteristic as a function of gap length and of feedback operating frequency. At zero frequency the impedance of the motor is resistive. At relatively high frequencies for the feedback apparatus, such as 10 to 30 hertz (cycles/second), the impedance is largely inductive.

The signals from the sensor elements pass through parallel paths in part of the feedback circuit. The division between the two paths depends upon the rapidity of the variation of the signal involved.

The resultant linearization of the feedback circuit provides a constant gain at all operating frequencies of the plural-phase power, thus at all speeds of propulsion; and for all operative gap lengths. This maintains a smooth ride at all vehicle speeds. Importantly, the smoothness of the ride can be altered by adjustment of the feedback circuit. It is not necessary to change the construction of the motor, or of any related parts of the structure.

Linearization of the voltage vs. force function for all gap lengths allows the dynamic response of the feedback signals to be constant. This provides constant stability for the system. The unidirectional variations of the feedback signals essentially modulate the propulsion energy.

One sensor element 20 is an accelerometer, giving an output for an acceleration in the vertical direction as motor 1 moves up or down in space without regard to the relationship of the motor to the rail. The output thereof passes through compensating network 21 to alter the frequency vs. amplitude response.

Another sensor element 22 is a position transducer. This gives length of gap information. It may employ mechanical contact, or optical or sonic means to accomplish the measurement. The gap length is usually within the range of from substantially zero to one-half inches. A second compensating network 23 provides an adjustable reference for the gap measurement in electrical terms, provides amplification, and differentiation to give a velocity signal. Thereafter, the position signal is algebraically summed with the acceleration signal for common amplification.

The attractive force between motor 1 and rail 2 is proportional to the square of the current passing through the coils of the motor. To provide feedback loop stability, this second order function must be linearized by square root circuit 24, typically an operational amplifier entity employing nonlinear transistor characteristics, to give an electrical output that is the equivalent of the square root of the electrical input.

Multiplier 25 is another operational amplifier entity in which the output is the product, not the sum, of two electrical inputs. The output of the square root circuit and the length of gap signal from the position transducer are multiplied. This gives a voltage that increases with gap.

The electrical path through multiplier 25 is independent of frequency. Thus, an electrical output is had at zero frequency, as for example, when the gap length is constant between motor and rail.

Perfect differentiator 26 is comprised of an amplifier having a resistance-capacitance circuit to accomplish electrical differentiation. The capacitor is not shunted by any conductive path and so the output of the differentiator is zero for zero frequency, that is, for DC. This provides an AC path with an output algebraically summed with that of multiplier 25, and gives an increasing voltage with increasing feedback frequency, as is required to linearize the motor response with frequency.

The output from multiplier 25 and differentiator 26 are equal at the frequency at which the motor DC resistance equals the motor AC reactance. At higher frequencies the motor flux is not a function of gap.

When propulsion of anything to which motor 1 is attached is involved, the speed of propulsion is proportional to the frequency of the plural-phase alternating current supplied to the coils of the motor. Thus, speed control 30 is the frequency control of three-phase variable frequency oscillator 31. What may be any number of phases from two upward has been chosen as three phases for the example in this specification. The phases are typically separated by 120 electrical degrees in time and the circuits are typically "star" (i.e., "Y") connected. The oscillator must supply alternating current from zero frequency to a low audiofrequency at constant amplitude and of essentially sinusoidal waveshape. An oscillator comprised of three mechanically driven sine-wave-generating potentiometers has been satisfactory in view of the relatively low frequencies involved.

The three-phase output, $\phi A$, $\phi B$, and $\phi C$, separately passes from the oscillator into three imperfect differentiators 32, 33 and 34. These differentiators are typically the series capacitor, low-valued resistor-to-ground type of circuit with the addition of a relatively high-valued resistor across the capacitor to give the imperfect differentiation. The differentiation is imperfect in that an output is provided at zero frequency. This is required in the feedback circuit of this invention to overcome the resistance of the motor windings at DC, and so to provide flux in the gap between the motor and the rail. Such flux is always required when the system is in operation, even though stationary, to maintain magnetic suspension of the mass, including the motor, from stationary rail 2.

Each output from imperfect differentiators 32, 33 and 34 becomes what may be termed the "X" input to each of three multipliers 35, 36 and 37 for each of the three phases. The other, or "Y," input is common to each multiplier and is the feedback signal obtained from multiplier 25—perfect differentiator 26 output.

Each multiplier gives the product of the instantaneous value of voltage according to the three-phase variation thereof by the voltage from the feedback circuit. Thus, whether or not there is propulsion, a common control is exercised over the control signals and suspension is maintained constant. These multipliers are of the same type as the previously discussed multiplier 25.

An output from each multiplier for each phase passes into controllable power supply 38. This consists essentially of three relatively high-power amplifiers, one for each phase, with the voltage output of each controlled according to the variation of three-phase electrical energy with time. This includes the special case of zero frequency, at which the three phases each have voltages and current according to the mode of three-phase variation, but there is no variation thereof with time. The particular values are "frozen" in each phase until a frequency variation is again produced to provide propulsion.

While Class B amplifiers having an output of 1 kilowatt or more apiece may be employed in a group of three for item 38, this amount of power is insufficient to propulse thousands of pounds of mass, such as a large passenger-carrying vehicle of the railroad car type. Accordingly, more efficient amplifiers of higher power capabilities, such as the Class D type or the gated-silicon-controlled-rectifier type are employed for such embodiments. The basic source of power for these amplifiers is an external power house source 39 of three-phase power.

The relatively large power output from each phase of controllable power supply 38 is conveyed to the corresponding plural-phase winding of motor 1, which is then attracted to rail 2 under feedback control to prevent the motor from attracting all the way to contact with the rail.

For a monorail suspended system, two motors with the complete system shown in FIG. 3 are employed. Each motor thus properly and independently adjusts for unevenness of the track, for changes in load upon the vehicle, and for dynamic perturbations.

For a two rail system, with the rails either over the vehicle, or under it with the motor held in relation to the rail with sturdy brackets, four motors with individual control systems are employed. This gives the usual stability of a four-wheeled vehicle.

In order to equalize the stress on the rail, or to provide greater suspension and/or propulsion capacity, more than two motors may be employed for the monorail, or more than four motors for the birail arrangement.

Figure 4A:
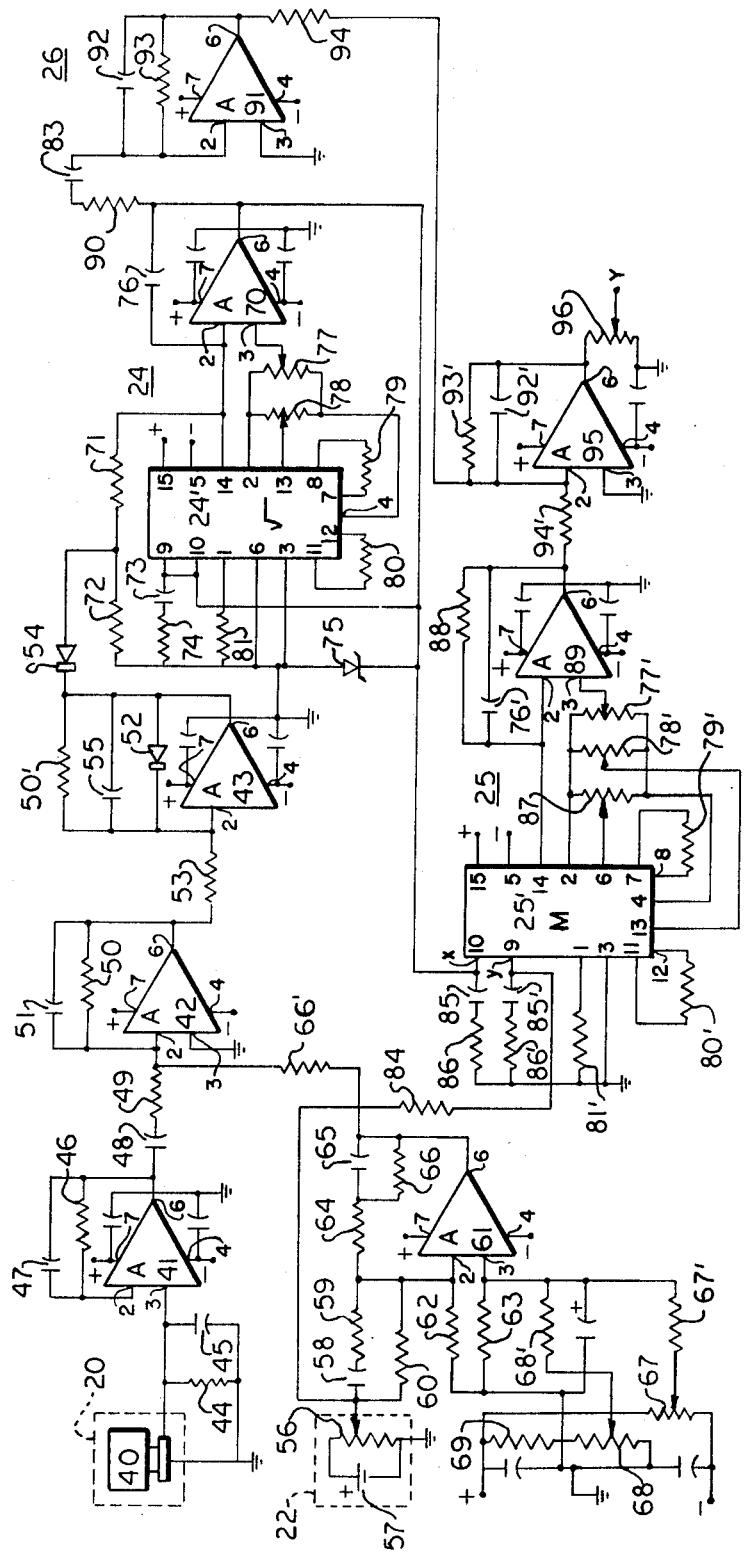
FIG. 4A is a schematic electrical diagram of principally the upper part of the block diagram shown in FIG. 3.

FIGS. 4A and B give the complete schematic diagram for the electrical system of the invention and follow the technology set forth in connection with the block diagram of FIG. 3.

Preliminary to considering the schematic diagram, the relation between the electrical and magnetic parameters is given in a set of equations, since the functioning of the circuit is readily identifiable with the equations.

The magnetic force of attraction F between the motor and the rail is proportional to the square of the current I flowing through the coils of the motor and is inversely proportional to the square of the length $l$ of the airgap.

Thus, $$F = k_1 \frac{I^2}{l^2} \qquad (1)$$

The expression is derived as follows:

$$F = \frac{\text{Area } \beta^2}{8\pi \times 981}$$

where:

$F$ = force in grams
Area = area of attraction, cm$^2$
$l$ = gap length, cm.
$N$ = number of turns of coil
$\beta$ = flux density, gauss and $$\beta = \frac{4\pi NI}{10l}$$

Combining:

$$F = \frac{\text{Area} \times N^2 \pi}{49,050} \frac{I^2}{l^2}$$

or $$F = k_1 \frac{I^2}{l^2}$$

which is Equation (1)

The current I through the complex impedance of the motor windings is, from first principles:

$$I = \frac{E}{R + j\omega L}$$

where:

$E$ = voltage across the impedance
$R$ = resistance of the coils through which the current is flowing
$j = 90°$
$\omega = 2\pi f$
$f$ = frequency, hertz
$L$ = inductance of the coils through which the current is flowing The inductance of a motor coil is inversely proportional to the length of the airgap:

$$L = k_2/l \qquad (3)$$

Combining and solving these equations for the voltage $E$, there is obtained:

$$E = k_3 \sqrt{F}(lR + k_4 j\omega) \qquad (4)$$

The motors may be built in a large range of sizes, but as an example, for a 30 inch long motor capable of supporting 2,000 pounds, the several constants have the following values, with dimensions expressed in inches:

$k_1 = 0.48$  $k_2 = 0.1$  $k_3 = 2.1$ and $k_4 = 0.1$

The above equations have significance in that the composition and the functioning of the nonlinear feedback circuit of this invention particularly follows equation (4), as will hereinafter be noted.

In FIG. 4A, accelerometer 20 is that described in connection with FIG. 3. An essential characteristic is that it have a mass 40 of relatively appreciable magnitude disposed to be sensitive to vertical acceleration. This plays an important part in accomplishing the "easy ride" that is characteristic of this invention. A piezoelectric type of accelerometer may be used, such as one of the Endevco-type 2200. The circuitry of FIG. 4A does not pass the very low-frequency "noise" and random variations known to be characteristic of this type. Alternately, the servo type accelerometer that was developed for space use and does not have the noise and variations may be substituted for the piezoelectric type.

In the circuit of FIG. 4A amplifier entities 41, 42 and 43 give the details of compensating network 21 of FIG. 3.

Amplifier 41 is a known impedance-matching amplifier and is required to reduce the very high impedance of a piezoelectric accelerometer to an ordinary circuit value. The amplifier may be a Motorola MC 1456G integrated circuit amplifier, or an equivalent operational amplifier. It is connected as a source-follower and has no gain, nor phase shift. The input circuit includes resistor 44, of 250 megohms resistance, connected from amplifier terminal 3 to ground to provide an input bias current path for the amplifier. This is shunted by capacitor 45, of 1,000 picofarads (pf.) capacitance, which acts as a padding capacitor to the stray capacitance of the input lead from the accelerometer to terminal 3. The several terminals of integrated circuits, operational amplifiers, etc., have been given small numerals in FIGS. 4A and 4B, corresponding to those given by the manufacturer on the device itself. The internal circuits for these devices are known from the manufacturer's catalogs.

Amplifier 41 has a feedback circuit between its terminals 6 and 2 comprised of a 250 megohm resistor 46, shunted by capacitor 47, of 1,000 pf. capacitance. Terminal 7 is connected to a direct current energizing power source having a voltage of the order of +15 volts, while terminal 4 is connected to a similar source having the opposite polarity of −15 volts. Each of these connections is filtered by a 0.1 microfarad ($\mu$f.) capacitor connected therefrom to ground.

Capacitor 48, of 200 $\mu$f. capacitance, is connected to the output terminal 6 of amplifier 41 and is present to restrict the low-frequency signal amplitude from the accelerometer with a roll-off starting at 0.13 hertz. This removes the "noise" from the accelerometer circuit at low frequencies. Resistor 49, of 6,800 ohms, is in series with capacitor 48 and with resistor 50, of 0.2 megohms, sets the accelerometer channel gain. Amplifier 42 provides an accelerometer channel gain of 200/6.8=30. The second terminal of resistor 49 connects to input terminal 2 of amplifier 42, a Motorola MC 1741CG integrated circuit or equivalent.

There is also another input connection to terminal 2; from the output of the gap-length sensor circuit, to be later described.

Amplifier 42 functions as a simple amplifier, having a feedback circuit connected between input terminal 2 and output terminal 6 comprised of resistor 50, of 0.2 megohm, shunted by capacitor 51, of 1,500 pf. The voltage supply and grounding connections are standard and are known.

The accelerometer and gap-sensor algebraically summed signal now passes into terminal 2 of amplifier 43, of MC 1741G type, through resistor 53, of 30,000 ohms resistance, which is used for gain setting. The same type of feedback circuit is employed for amplifier 43 as was employed for amplifier 42; i.e., resistor 50' of 0.2 megohm and capacitor 55 of 0.2 microfarad. Supply circuits are conventional. The output from amplifier 43 is taken from terminal 6 and passes through diode 54, with the cathode thereof connected to the terminal so that only negative signal variations will be passed on. Additionally, diode 52 is connected as a feedback element on amplifier 43 to prevent positive voltage excursions.

Only negative voltages are allowable at the input of the square root circuit which follows because inversion therein to positive signal polarity occurs before the square root function takes place. This prevents taking the square root of negative numbers, which are imaginary. Herein the square root circuit becomes inoperative because feedback of positive polarity drives it to current saturation.

We return now to the second sensor element, position transducer 22 of FIG. 3, a device 56, which may take many forms. As shown, it is a linear potentiometer connected to ground and shunted by a source of voltage, as battery 57. The slider is provided with a mechanical roller. This rides on the upper side of rail 2, which is parallel with the lower or operative side of the rail. It is held in contact with the rail by a spring (not shown). The whole is mounted upon the structure of motor 1.

Typically, battery 57 may have a voltage of 10 volts and the travel of the slider of the potentiometer have a travel of one-half inch. This range of travel normally covers the operating change in the length of the airgap, the preferred length of which is one-fourth inch or perhaps slightly less. These constants give a voltage of 20 times $l$; i.e., 20 times the length of the airgap as measured in inches. Battery 57 may, alternately, be a regulated power supply of the same voltage.

An alternate displacement sensor 56 may be arranged with a photocell on one side of the rail-motor gap and illumination means on the other. As the gap elongates, more light enters the photocell and a greater electrical response therefrom is obtained, while the reverse is true of the device if the gap narrows.

A further alternate may employ ultrasonic sound, with an electrical response provided by detecting the phase of the sound reflected from the rail.

The output from position transducer element 22 passes to compensating network 23 of FIG. 3, which is associated with this transducer. In FIG. 4A, capacitor 58, of 0.1 $\mu$f., in series with resistor 59, of 4,700 ohms, all shunted by resistor 60, of 1.5 megohms, are the initial elements of compensating network 23. This network has a resistive impedance of 1.5 megohms from DC to 1.2 hertz, decreasing to about 4,700 ohms at 350 hertz. This provides a velocity signal (i.e., differentiated displacement) at frequencies above 1.2 hertz.

This output passes to input terminal 2 of operational amplifier 61, an MC 1741G type as before. Both input terminals 2 and 3 of this amplifier are individually returned to ground through resistors 62 and 63, of 22,000 ohms, to provide a path for the input bias currents of this amplifier.

The feedback circuit for amplifier 61 is comprised of resistor 64, 10,000 ohms, in series with capacitor 65, 100 $\mu$f.; with resistor 66, 100,000 ohms, shunted across the capacitor. This gives an impedance of 110,000 ohms for DC and of 10,100 ohms at 14 hertz, approximately. This results in the gain of amplifier 61 at frequencies below 1 hertz being considerably greater than at higher frequencies. This is to increase the loop gain at low frequencies and to provide an integral of displacement function as a feedback signal to gradually correct for changes in load.

Since the purpose of the feedback system is to correct for changes in loading of the vehicle, wind pressure and unevenness of the track, the frequency of the feedback signals is very low with respect to the frequencies handled by usual electrical networks. Feedback must be maintained at zero frequency (DC). The range of frequencies of maximum interest extends from 0 to 5 hertz for the displacement channel and from 0.3 to 30 hertz for the accelerometer channel.

Potentiometer 67, of 50,000 ohms total resistance, is connected between positive and negative voltage supply sources, each of which may have a voltage of 15 volts with respect to ground. Bypass capacitors, of 50 $\mu$f., are provided from each to ground to remove extraneous variations, as known. Potentiometer 67 provides a voltage adjustment for any initial offset voltage in amplifier 61. The slider is connected to input terminal 3 thereof, through isolating resistor 67' of 1.0 megohm.

An additional input to terminal 3 of amplifier 61 is from potentiometer 68, of 2,000 ohms, and passes through attenuating resistor 68', of 1.5 megohms, to provide a reference displacement proportional voltage. Amplifier 61 generates an output voltage proportional to the difference between the voltage reference input to resistor 68' and the input to resistor 60, which is the voltage from displacement transducer 22. Voltage dropping resistor 69, connected in series with potentiometer 68 from the positive voltage connection to ground, typically has a resistance value half as great as the resistance value of potentiometer 68.

The output of amplifier 61, from terminal 6, passes to terminal 2 input of amplifier 42 through resistor 66', of 22,000 ohms, a summing resistor. It is at this point that compensating network 23 joins that of 21, for the inclusion of amplifiers 42 and 43 in common.

The voltage output at amplifier 43 is to be treated to be linearly proportional to a force between the load mass and the rail. Referring to equation (4), to develop the proper voltage E to be applied to the motor windings, the force-proportional voltage is to be square rooted and multiplied by $(lR+k_l jw)$.

The first electrical device to significantly execute the mathematics of linearization is the square root circuit identified as 24 in FIG. 3 and as 24'-70 in FIG. 4A. This may be a Motorola integrated circuit MC 1494L, normally known as a "multiplier" of electrical signals fed into it. This is placed in the feedback circuit of an operational amplifier and the square root of the single input provided is obtained.

The theory and practice of this square root performance is known, being set forth in the (Motorola) manufacturer's, "Specifications and Applications Information," Oct. 1970—DS 9163. In FIG. 4A herein the operational amplifier required is identified as 70, and may be an MC 1741G integrated circuit.

In FIG. 4A, the output from the previously mentioned diode 54 is connected to gain-setting resistor 71, of 52,000 ohms, and also to ground through resistor 72, of 1,000 ohms. The latter resistor provides a path for any leakage current in diode 54. The input from resistor 71 is connected to terminal 14 of multiplier 24' and also to terminal 2 of amplifier 70. The output of this amplifier, at terminal 6, is connected to terminals 9 and 10 of the multiplier and also to ground by a small capacitor 73, of 10 pf. capacitance, in series with resistor 74, of 510 ohms. Zener diode 75 is also connected between the output of amplifier 70 and ground to prevent accidental latchup (malfunctioning) of the circuit. A type 1N5241 may be used.

The feedback path for amplifier 70 is the multiplier 24' connected between input terminal 2 and output terminal 6 of amplifier 70 and terminals 9–10 and 14 of the multiplier. Capacitor 76, of 10 pf. capacitance, and connected between amplifier terminals 2 and 6 is for the purpose of phase-compensating the amplifier. Input terminal 3 thereof is connected to the slider of potentiometer 77, which potentiometer has a resistance of 20,000 ohms. This provides a voltage reference for the amplifier. This potentiometer is connected in parallel with a duplicate potentiometer 78, which is connected between terminals 2 and 4 of multiplier 24'. Also associated with multiplier 24', resistor 79, 62,000 ohms, is connected between terminals 7 and 8; resistor 80, 30,000 ohms, is connected between terminals 11 and 12; and resistor 81, 16,000 ohms, is connected between terminal 1 and ground. A voltage source, typically of 15 volts, of positive polarity is connected to terminal 7 of the amplifier and terminal 15 of the multiplier, whereas a voltage source, typically of 15 volts, of negative polarity is connected to terminals 4 and 5, respectively.

At the input to the whole square root circuit 24 of FIG. 3, a negative signal voltage of 4 volts produces in the whole system a force of 1 g. That is, an equal and opposite force in relation to that of gravity, and so the motor vehicle mass is magnetically suspended. With the connections and voltages given, the output of the square rooter at terminal 6 of amplifier 70 is the square root of 10 times the input. This is the square root of 10 in effective amount and is taken into consideration in establishing the whole feedback gain. Mathematically, such functioning of the electrical circuits is accounted for in the values of the several $k$ constants.

The output from the square root circuit is connected to the input of multiplier 25 to perform the $IR$ portion of equation (4), and also to the input of perfect differentiator 26 to perform the $k_4 jw$ term, as seen in FIG. 3. In FIG. 4A the input to multiplier 25' is terminal 10 thereon and to the perfect differentiator is capacitor 83 through resistor 90.

The above input to the multiplier may be termed the "$x$" input. The "$y$" input is connected to input terminal 9 and comes directly from position sensor 22 (56 being one embodiment) through resistor 84 for isolation. The resistance value of resistor 84 may be 0.1 megohm. Both input terminals 10 and 9 are also connected to ground through capacitors 85 and 85', of 10 pf capacitance, in series with resistors 86 and 86', of 510 ohms resistance, respectively. These prevent high-frequency parasitic oscillations.

Resistors 79', 80', and 81' are identical in resistance value and connection to multiplier unit 25' as these were with respect to unit 24'. So also are potentiometers 77' and 78', except that the resistance value of potentiometer 77' is 50,000 ohms. An additional potentiometer 87, of 20,000 ohms, is connected across terminals 2 and 4 of units 25', with the slider connected to terminal 6. These three potentiometers are adjusted to give proper "$x$," "$y$" and output offset bias, as outlined in the manufacturer's "Specification and Application Information" previously referred to.

An MC 1741G operational amplifier 89 coacts with multiplier unit 25' to give the complete multiplier 25 of FIG. 3. Feedback capacitor 76', of 10 pf, is connected to the amplifier at terminals 2 and 6, and is shunted by resistor 88, of 52,000 ohms. Positive and negative voltage supply sources are as before.

Perfect differentiator capacitor 83 has a capacitance of 0.2 $\mu f$. It is in series with resistor 90, of 1,000 ohms resistance. The capacitor connects to input terminal 2 of operational amplifier 91, which may be a MC 1741G type. The feedback circuit of this amplifier is comprised of capacitor 92, 0.0068 $\mu f$., and resistor 93, 0.1 megohm, in parallel and connected between amplifier terminals 2 and 6. Second input terminal 3 is grounded. Positive power supply voltage is connected to terminal 7, while the same in negative polarity is connected to terminal 4. This amplifier-differentiator provides the first derivative of the input over a frequency range of from essentially zero to 200 hertz.

The output from amplifier 91 is taken through summing resistor 94, 62,000 ohms, to input terminal 2 of amplifier 95. The latter mainly raises the signal level, after providing for the summing, for parallel feeding all of the three-phase multipliers that follow.

Similarly, the output from multiplier operational amplifier 89 is taken through summing resistor 94', 62,000 ohms, and connects to input terminal 2 of amplifier 95. This provides the total electrical representation of $\sqrt{F(IR+k_4jw)}$ of equation (4).

The feedback circuit 92', 93' of amplifier 95 is the same as the feedback circuit 92, 93 of amplifier 91; also, input terminal 3 is connected to ground and the power supply connections are the same as before.

Figure 4B:
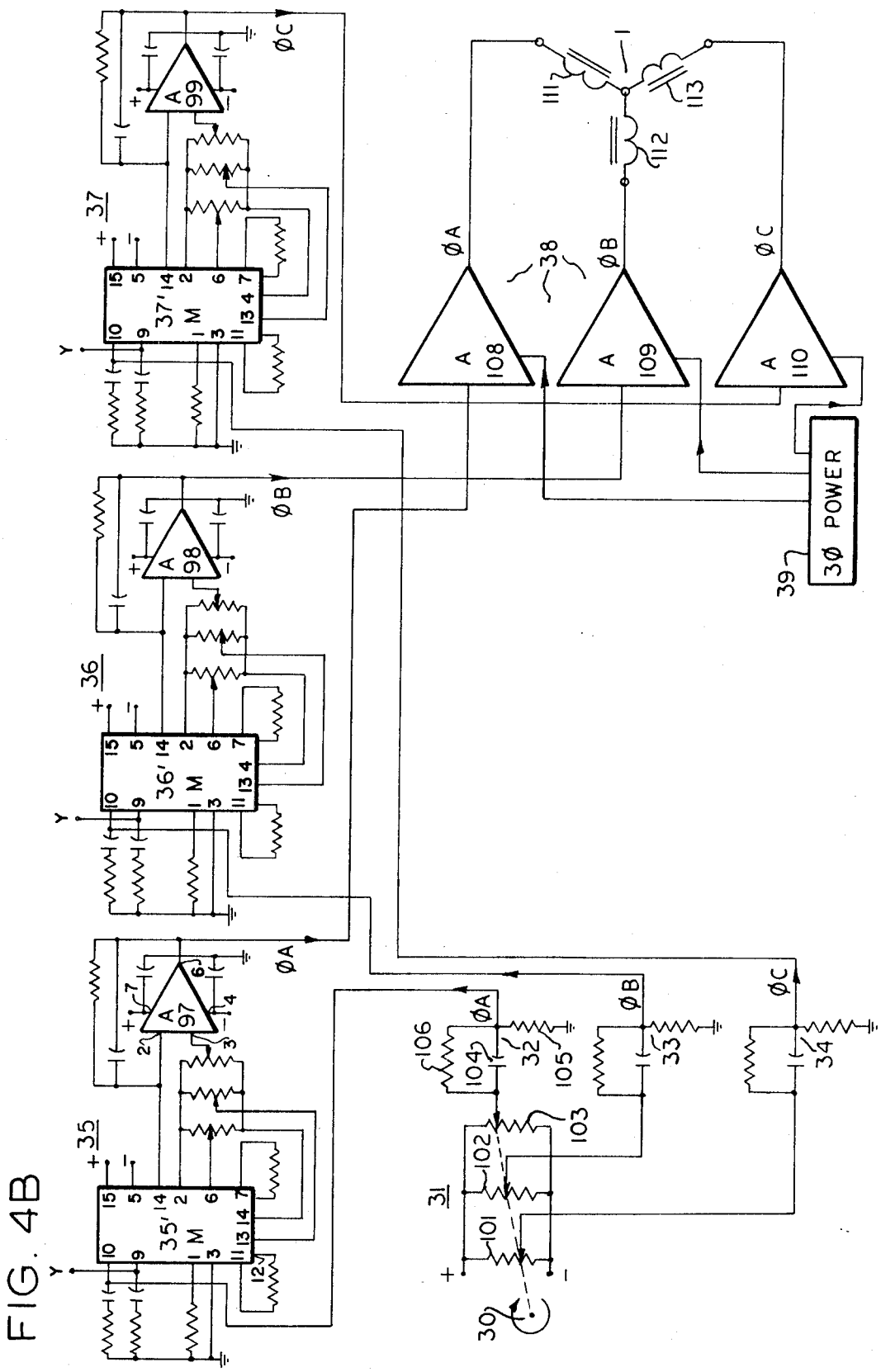
FIG. 4B is a schematic electrical diagram of principally the lower part of the block diagram shown in FIG. 3.

The output at terminal 6 of amplifier 95 passes to potentiometer 96, the second terminal of which is connected to ground. The slider of the potentiometer is connected to all terminals 9 of the three multipliers 35', 36', and 37' of FIG. 4B. These multipliers are the essential units of the three multipliers 35, 36 and 37 of FIG. 3. The accompanying operational amplifiers in FIG. 4B are 97, 98 and 99, respectively. This single control feedback input performs the function of maintaining suspension with or without propulsion and regardless of what the individual voltages in phases A, B and C might be at any instant of time according to the inherent variation of three-phase electric power. The combined gains of potentiometer 96, multipliers 35, 36 and 37, and the voltage gain of controllable power supply 38 determines $k_{3/2}$ in equation (4) so that 4 volts of signal at the input of square rooter 24 is 1 g.

Adjustment of the suspension gap length $l$ is accomplished by varying the voltage at the input 3 of amplifier 61, as determined by the setting of potentiometer 68, of FIG. 4A.

In FIG. 4B the common control from the feedback circuit is identified by "Y." An individual phase input is also provided. Phase A is connected to terminal 10 of multiplier unit 35'.

The internal and external connections of unit 35' and of its accompanying operational amplifier are all the same as previously detailed for multiplier-amplifier 25'–89 of FIG. 4A, and so will not be repeated. The phase inputs for the three multipliers arise in three-phase oscillator 31, to be later described. The output from terminal 6 of amplifier 97 is connected to $\phi A$ of controllable power supply of FIG. 3 identified as 38. This is represented as the input to power amplifier 108 in FIG. 4B.

In the same manner, multiplier 36'–98 handles $\phi B$, and multiplier 37'–99 handles $\phi C$.

Devices relating to the propulsion and the connections thereof to the above multipliers are also detailed in FIG. 4B.

Speed control 30 is schematically shown as a rotatable (dotted line) shaft attached to the sliders of each of potentiometers 101, 102 and 103. These potentiometers are preferably wound to provide a sinusoidal variation of voltage with motion of the sliders, are of circular configuration, and are suited for full and repeated rotation of the sliders. Each slider is attached to the shaft at 120 electrical degrees from the others, in usual three-phase fashion. The potentiometers comprise three-phase variable frequency oscillator 31. These are electrically connected in parallel, at one extremity to a source of positive supply voltage, such as 15 volts, and at the other extremity to a source of negative supply voltage, also 15 volts.

For testing, shaft 30 can be revolved by hand. For commercial use it can be revolved by a geared-down variable speed motor. The speed control on the motor becomes the manually operated speed control, to be adjusted by the driver of the vehicle. It is desirable to limit the acceleration involved in moving the vehicle down the track to one-tenth $g$; i.e., one-tenth that of the acceleration due to gravity. This can be controlled by arranging a dashpot-type element attached to the speed control on the motor so that sudden speed changes are not possible.

Another suitable oscillator is the function generator, type 120–020–manufactured by the Wavetek company of San Diego, Calif.

One imperfect differentiator, 32, 33 or 34, is connected to each phase output from oscillator 31. Considering imperfect differentiator 32; capacitor 104, of 20 $\mu$f. capacitance, is connected to the slider on potentiometer 103 and also to resistor 105, the latter having the relatively small value of 1,000 ohms. The second terminal of the resistor is connected to ground.

As was explained in connection with FIG. 3, an output at DC is required of these differentiators. Resistor 106, of 10,000 ohms, is connected in shunt to capacitor 104 to provide such an output and cause the differentiators to be of the imperfect type. The output is taken at the connection between elements 104 and 105 for $\phi A$. The structure for imperfect differentiators 33 and 34 is identical to that of 32, and so will not be detailed.

Controllable power supply 38 has already been described in connection with FIG. 3 as comprised of three high-power amplifiers. Class B amplifiers and the circuit diagram for the same are well known. The same for a Class D amplifier, a recognized IEEE designation, is available commercially from TRW Semiconductors, Inc., Lawndale, Calif.: their type MCB 1002. A similar variable pulse-width switching-type amplifier, but which uses silicon-controlled-rectifiers instead of power transistors, is available from the Gates Learjet Corp., Irvine, Calif.

In FIG. 4B these amplifiers are shown as 108, 109 and 110, for phases A, B, and C, respectively. Each amplifier provides an output to a corresponding winding 111, 112 and 113 of suspension and propulsion motor 1, also shown. Each amplifier is individually fed from a corresponding multiplier 35, 36 or 37. In FIG. 4B, these multipliers terminate in amplifiers 97, 98 and 99, respectively, which may be integrated circuits.

Typically, 220 volt three-phase electric power is supplied to each amplifier 108, 109 and 110 from a stationary source of power 39, such as a power house. It reaches the amplifiers through a plural conductor "3rd rail" 39', with which plural contacts carried by the vehicle make contact. Each amplifier may accordingly include a three-phase rectifier to provide the DC energizing power as is usually required. In an alternate arrangement, direct current is directly supplied to the vehicle by a single 3rd rail.

The circuit of FIGS. 4A and 4B is for one motor 1 (as is further illustrated in FIGS. 1 and 3). With this arrangement, each of the plural motors usually required for a vehicle has its own sensor means and feedback control circuit for superior response to variations brought about by unevenness of track, etc.

The motors may be built in a wide range of sizes; however, a length of from 15 to 30 inches and a width of motor and rail of the order of 3 inches is typical. For a 30 inch three-phase motor, the weight is 125 pounds. When excited it can suspend 2,000 pounds. When it is suspending only, the vehicle being at rest, 400 watts per phase of power is consumed and the kilovolt-ampere wattless power has the same value. As the motor provides propulsive force the kilovolt-amperes increases at a faster rate than does the wattage loss. At 45 miles per hour and full thrust these values are 80 KVA and 25 KW per motor, respectively, as determined by exterpolating motor impedance measurements.

The performance of the feedback circuit of this invention is maintaining a constant length of airgap between motor and rail is believed to provide significant functioning required for practical magnetic-supported transportation; functioning which has hitherto been unknown or unexplained.

The force exerted magnetically by the motor in providing suspension varies as the square of the current in the windings of the motor. This is a nonlinear relation. Nonlinear elements in the feedback circuit, such as the square root circuit 24 of FIG. 3, make the output of the feedback circuit linear, from a voltage input to a force output. This results in a constant feedback loop gain at all values of alternating current frequency (speed of the vehicle) and at all gap lengths of the motor to the rail. Moreover, this results in a uniform easiness of ride. A typical variation of gap may extend from +100 percent to nearly −100 percent of a normal value of one-fourth inch. To prevent the motor from actually contacting the rail, a flat automotive-type brake shoe may be arranged to bear upon the rail instead, as a safety measure.

Because an inertial reference, accelerometer 20, is used in the vertical plane, the feedback circuit ignores small track irregularities and does not pass them on to the passengers in the form of vibration or quick jolts. Only a mean gap is maintained by the displacement (position) transducer 22. Prior systems, suggesting known "solidih.feedback, do pass on all track irregularities to the passengers.

It has been found that the attractive type suspension system with nonlinear feedback according to this invention exhibits damped lateral stability. This is economical of weight required to be carried for the inherent operation of the vehicle. Each motor 1 provides suspension, propulsion and lateral stability. Experimentally, a perturbation pushing the motor sideways with respect to rail 2 causes the current to increase through the amplifiers of controllable power supply 38, which acts to keep the gap length constant. A restoring force is noted, laterally, which increases with lateral displacement.

Upon the perturbative lateral force being removed, the motor returns to an aligned position with the rail in a damped manner, and does not overshoot. The damping arises from two factors: the resistance of the coils in the motor windings, and a back electromotive force created in the windings by the lateral displacement. The energy represented by the former is dissipated in the resistance of the coils, and by the latter is restored to the power mains through controllable power supply 38 by generator action.

Preferably, the width of the magnetic structure of motor 1 is at least 10 percent greater than the magnetic structure of the rail 2 for vigorous lateral stability.

It is to be noted that lateral stability is not inherent in a repulsive magnetic support system, with a motor over a rail. In such a system an auxiliary magnetic motor or mechanical rollers are required, to act laterally against the rail.

The feedback loop that includes accelerometer 20 makes a second order correction to the overall feedback network. This is about 10 db of feedback over the frequencies of interest, from one-half to 5 hertz. This makes the system insensitive to second order variations: such as variations in the magnet structure of a motor 1, as may be encountered in practical construction, the AC resistance of a coil thereof, the change of coil resistance with temperature, as well as variations of the DC gain and of the AC gain of the feedback network. The second order correction also prevents instability at certain gap lengths.

The prior art does not appear to have discussed these matters, which are of significance in providing an inherently stable transportation system despite day to day variations in parameters, weather, and other practical matters, including the capability of smoothly handling gap variations caused by rough rail alignment.

Considering operative details of a typical embodiment for the transportation of people, the gain of amplifier 41 of FIG. 4A is, of course, unity. The gain of amplifier 42 is approximately 30, up to an upper cutoff frequency of 8 hertz. The gain of amplifier 43 is approximately 7, with an upper cutoff frequency of 4 hertz. When the output of this amplifier is −4 volts, the force exerted by motor 1 is 1 g.; i.e., the vehicle is suspended.

In forming the feedback circuits according to this invention use is made of the fact that the AC flux density in the motor to rail airgap does not vary if the length of the gap changes. This flux density is affected only by the value of the volts-per-turn in the magnetic structure, and so the voltage only in any given magnetic structure. Multiplier 25 of FIG. 3 provides compensation for DC flux density changes with changes in the length of the airgap. Position transducer element 22 senses the DC gap length and the gain of the feedback circuit is modulated to increase with gap length, maintaining the overall system gain, including the characteristics of motor 1, constant.

In a typical motor the inductive reactance of the coils is equal to the resistance of the coils at a frequency of the order of 2 hertz. The inductance does vary inversely with the length of the airgap, but proper feedback performance is maintained by having the DC path through multiplier 25 and the AC path through perfect differentiator 26. The exciting current through the motor coils increases with gap length, thus the DC flux remains constant.

In practical operation, this necessary mode of operation requires that extended periods of suspension at long airgaps cannot be allowed. It is good practice to rate the amplifiers comprising controlled power supply 38 for the average length of gap encountered and to return the vehicle to that length within a few seconds without causing an artificial jolt after a gap-lengthening perturbation.

Capacitor 55, of 0.2 $\mu$f. capacitance, FIG. 4A, which is connected between output terminal 6 and input terminal 2 of amplifier 43, acts as a partial integrator upon the acceleration feedback signal. This provides a quasivelocity feedback signal and prevents an oscillatory condition otherwise existing because of an 180° phase shift between acceleration and displacement. This is effective from a frequency of the order of 10 hertz down to 4 hertz.

Below 4 hertz differentiation of the position (displacement) feedback occurs to provide the velocity component. This is produced by capacitor 58 in the input circuit to amplifier 61, shown in FIG. 4A.

The combination of these two signals gives control of the phase of the feedback circuit so that displacement information can be fed into a system that has feedback from an accelerometer included in it. Actually, four aspects of feedback are present in the system to give a high degree of stability; the integral of displacement to bring the system back to a mean gap length after load changes in the vehicle, displacement feedback to stabilize the integral displacement feedback circuit, velocity feedback to stabilize and damp the displacement feedback, and acceleration feedback to stabilize and damp the velocity feedback. At the same time the acceleration feedback corrects second order nonlinearities in the linearizing acceleration circuit comprised of square rooter 24, multiplier 25, and differentiator 26 in FIG. 3.

Acceleration and force are synonymous in equation (4). The above-described mode of operation is required for any system of the nature of a magnetically supported railroad, where the airgap length is purposely allowed to vary to accommodate "rough track." The gap is brought back to a mean value gradually, to provide a soft ride.

Figure 5:
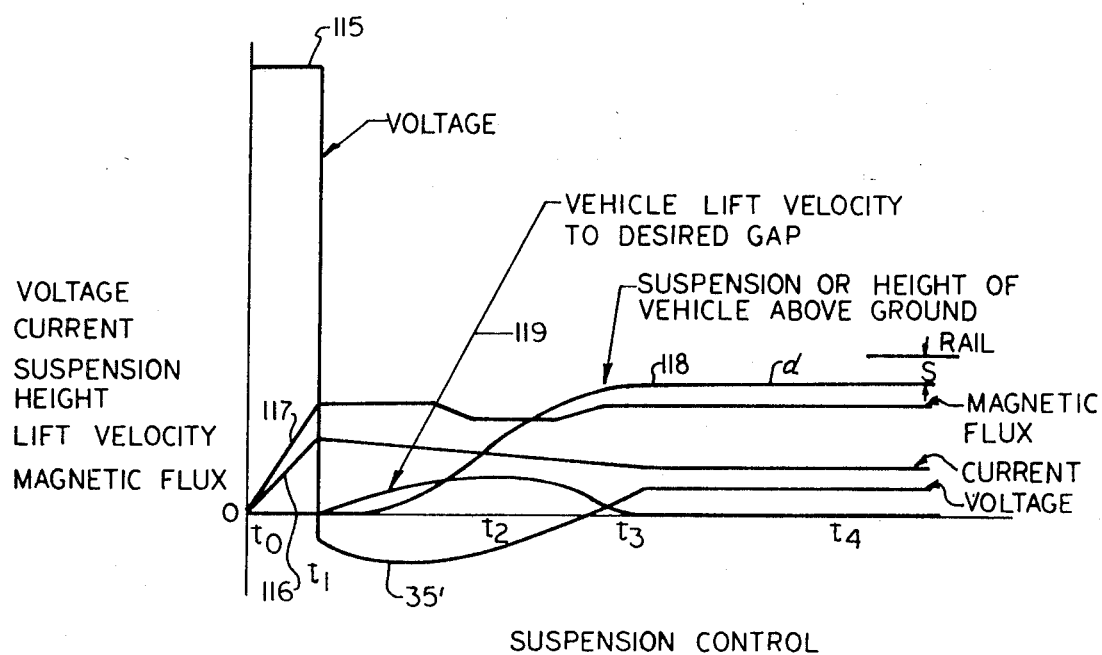
FIG. 5 is a graph showing the variation of voltage, current and flux vs. time as the mass (vehicle and motors) is lifted from the ground to within the desired operating airgap between the motor and the rail, and for maintaining the operating gap.

FIG. 5 shows the variation of the several parameters involved in lifting the motor (and vehicle) from the ground toward a rail and maintaining the airgap between the motor and the rail at a prescribed length.

The vehicle is to be raised a distance $d$ to reduce the airgap length $l$ to a desired value $s$. This value may be of the order of one-fourth inch for a railway-type vehicle. No forward motion of the vehicle is assumed in FIG. 5; the process being considered is for establishing magnetic suspension of the vehicle.

In the graph the abscissa is time and the ordinate has various values, as will be evident.

At time equals zero; i.e., the start of the lifting process, the voltage is impressed upon the coil windings of the motor. It rises to a high saturation level, as shown at 115. The corresponding current 116 in the windings involved starts with a zero value at time equals zero and increases as a ramp function until time $t_1$, at which time an upward velocity of the vehicle toward the rail starts. The magnetic flux produced by the motor and extending into the rail increases as the current increases and so this is a companion ramp function, shown as 117 in FIG. 5.

As soon as an upward velocity of the vehicle starts an acceleration exists and this is sensed by the accelerometer. Through the feedback circuit that has been described the accelerometer signal reduces the applied voltage 115 to zero; actually to a small negative value as shown. This allows the upward velocity to be controlled. After an initial value of zero at time $t_1$ it reaches a maximum value at a later time $t_2$, at and after which time the upward velocity is decreased.

Displacement curve 118 starts from zero at time $t_1$ and increases positively, but at a slower rate than the previously mentioned velocity curve 119. The proper value of feedback signal causes the displacement curve to cease changing with time after a time $t_3$ is reached. This signifies attainment of the preselected gap length. At time $t_3$ velocity curve 119 has decreased to zero. The desired vertical position has been achieved. At time $t_3$ the length of the airgap has decreased from the initial value. Less current 116 is thus required to maintain the needed flux and so this parameter remains constant with time at a value less than that existing at time $t_1$.

Flux curve 117 remains at a constant value with respect to time from time $t_1$ to about half-way between time $t_1$ and $t_2$. The flux is then reduced to a value less than that required to support the weight of the vehicle. This causes the upward velocity of the vehicle to be reduced, thus producing a negative acceleration, or deceleration.

The prior negative value of applied voltage reverses as the other parameters reach equilibrium shortly before time $t_3$. After time $t_3$ it remains at a relatively small positive value that is sufficient to cause current 116 to flow at an amplitude to maintain flux 117 at a constant value.

By time $t_3$ has been reached the airgap has been reduced to the preselected value of $s$. It remains at that value unless there be external factors acting to change it. If such factors tend to increase the gap length the same variation of the several parameters as previously described occurs and the gap length is reduced to the preselected value. If such factors tend to decrease the gap length the several parameters vary in the opposite manner.

Figure 6:
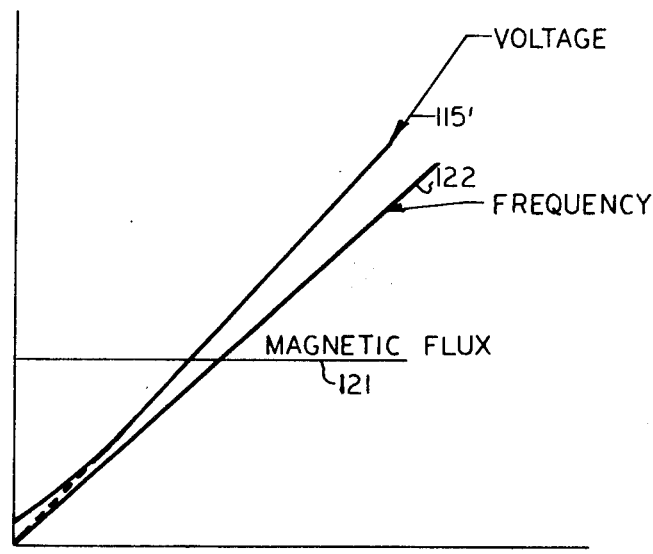
FIG. 6 is a graph showing the variation of voltage and frequency vs. the speed of translation of the vehicle and motor along the rail.

FIG. 6 is a graph showing the variation of essential electrical parameters with horizontal velocity of a vehicle attached to a motor. The vertical aspects of the electrical characteristics of the motor are assumed to be established, as after time $t_3$ in FIG. 5, and that these do not vary. Should there be a vertical variation at the same time that the vehicle is moving, as due to uneven track or a change in load, then the actual variation of the parameters is a combination of the variations on both graphs.

In FIG. 6 it will be noted that the value of magnetic flux 121 is constant at all values of horizontal velocity. This condition is maintained by the operation of the feedback circuit of FIG. 3.

The velocity of the vehicle increases as a direct function of frequency 122 of the plural-phase alternating current flowing in the plural-phase windings of motor 1. Thus, it is represented by a straight line of positive slope that passes through the origin of the graph. The higher the frequency the more rapidly the position of stable magnetic equilibrium moves along the linear extent of the motor, thus the more rapidly motor 1 moves with respect to the stationary rail (track) 2.

Because the motor-gap-rail assembly is a magnetic structure largely of the ferromagnetic type, it makes a considerable contribution to the inductance of the plural-phase windings. The impedance of the windings thus increases with frequency because of the increase of inductive reactance. Voltage relation 115' as a function of speed of the vehicle is thus defined by a straight line of positive slope directed toward the origin and having a slope determined by the value of the inductance of the windings as used in the suspension and propulsion mode. An asymptotic approach to this straight line of voltage 115 occurs up from the origin (above it) near the zero velocity abscissa because of the DC resistance of the motor windings. See also FIG. 5, the voltage value after $t_3$. Imperfect differentiators 32, 33, 34 act to produce curve 115'; keeping current constant.

Figure 7:
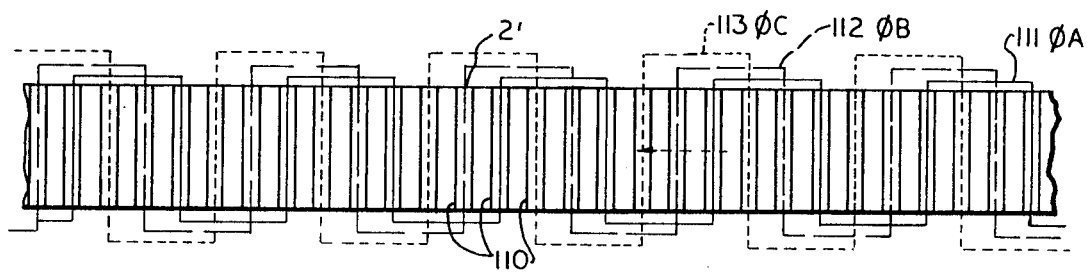
FIG. 7 is a plan view of a length of an electrically active, wound, power-supplying rail.

FIG. 7 shows a section of a wound rail. One or more such rails may be employed in an alternate method and structure of this invention for feeding power to the motors of the vehicle by means of what can be termed the amplidyne principle.

A modified rail 2', which may be longitudinally laminated for high-speed transportation use, is provided with uniformly spaced transverse slots 110 on its lower face. This face is shown upward in FIG. 7 for clarity.

Plural coils carrying plural phases of alternating current electric power are shown schematically wound in the numerous slots 110. In FIG. 7, three phases are shown, coil 111 for $\phi A$ in full lines, coil 112 for $\phi B$ in dashed lines, and coil 113 for $\phi C$ in dotted lines. Each coil may have more than one turn in the slot shown, before passing down the rail to the next coil configuration.

This rail is employed with the three-phase wound motor shown in FIGS. 1 and 2. The motor-wound-rail system is operated so that the alternating current frequency of current flowing in the rail coils is different from that required in the motor coils for propulsion. propulsion. This is accomplished by providing sufficient leading power factor elements as an electrical load on the vehicle-mounted motor. Capacitors are employed to cause the power factor of the motor to be leading.

Under these conditions the wound portion of motor 1 has an alternating current of low frequency in it, rather than an induced direct current, as would be the case for synchronous operation. The coils in the rail act as the primary of an energy-furnishing transformer, of which the coils in the motor are the secondary. The transfer of energy to the motor(s) of the vehicle is sufficient to provide the suspension current therein, and an excess for air conditioning, lights, etc., in the vehicle. The rail may be considered the wound armature and the motor coils as the field of a wound-rotor wound-stator reluctance motor.

A 3rd-rail type of power pickup is not required.

Figure 8:
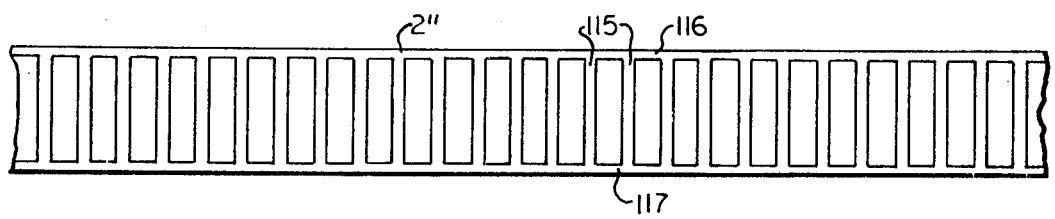
FIG. 8 similarly shows a length of induction motor-type rail.

FIG. 8 shows an induction motor-type rail. It is the equivalent of the squirrel-cage rotor of the usual rotary type induction motor.

The rail 2", which may be assembled of longitudinally laminated strips of ferromagnetic material for high speed transportation use, is provided with uniformly spaced transverse slots on its lower face. This face is upward in FIG. 8, for clarity of illustration. The slots are spaced the same distance as the slots containing the windings of motor 1, as seen in FIG. 2.

Each slot is provided with a relatively highly conductive material, such as aluminum, 115, which is bonded to the so-called shorting bar 116 and 117 on each side of the rail. Typically, the slots are one-half inch deep by one-half inch wide for a 3 inch wide rail. The aluminum material may be formed in a long cutout strip and forced into the slots in the rail per se. This construction provides repetitive electrical discontinuities.

This motor-rail combination functions in the same manner as the known rotary induction motor. The relative motion between motor and track is slower than synchronous speed. The consequent moving magnetic flux passing through the aluminum "winding" in the rail slots produces circulating currents in the slot-shorting-bar structure. The magnetic field created by these currents then interacts with the flux from motor 1 and a propulsive force is produced.

The induction-type rail may be simplified by merely providing an aluminum sheet on the underside of the ferromagnetic rail as it is oriented in use. Therein the circulating currents mentioned above are induced upon slip occurring. These find their own paths in the aluminum sheet, giving the required interacting flux. This is a simple alternate embodiment, but results in a reduced mechanical gap for clearance between the motor and the rail.

Figure 9:
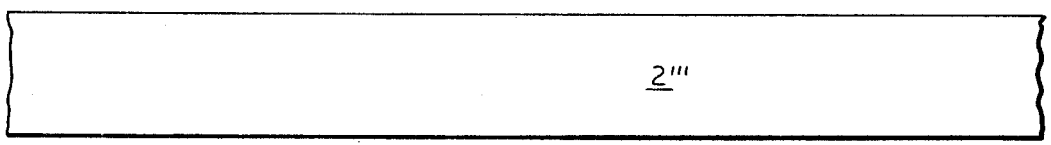
FIG. 9 similarly shows a length of uniform hysteresis motor-type rail.

FIG. 9 shows a length of uniform hysteresis motor-type rail 2'''. This may be the top surface of the known steel rail of existing railroads, should the propulsion aspect of this invention be employed without the suspension aspect. Otherwise, the drawing represents the bottom surface of a rail suspended so that motor 1 of this invention may also be suspended below it for the suspension and propulsion of a vehicle. The rail is magnetically homogeneous.

In addition to steel as a material for this rail certain ferrites, such as Ferroxcube Corp. Type 3B7, may be used. For the purposes of this invention the hysteresis loop of the rail material is preferably rectangular, which gives maximum thrust during the demagnetization cycle. For the hysteresis mode of operation the rail becomes magnetized to some degree in the nature of a permanent magnet. This magnetically interacts with the magnetic field of motor 1.

Referring to FIGS. 4A and B as to operation, when the suspension system of the vehicle is inactive and it is resting on physical supports, not shown, which are provided on the railway; to activate the suspension system and properly relate the motors 1 to rail 2, electric power from 3 $\phi$ power (supply) 39 is applied to power amplifiers 108, 109 and 110 and the several power sources indicated as + and − are energized.

The slider of potentiometer 68 is adjusted to apply a reference voltage to terminal 3 of amplifier 61 equal to the voltage required at terminal 2 of amplifier 61 to lift the vehicle to the desired length of gap from rail 2.

The feedback system then increases the current from power amplifiers 108, 109 and 110 through windings 111, 112 and 113 in motor 1 causing the motor and attached mass to rise. Position transducer 22 senses the consequent length of gap and causes the voltage at terminal 2 of amplifier 61 to equal that at terminal 3 when the desired length is reached.

Regenerative braking may be employed with the systems of this invention. To accomplish this motor windings 11, 12 and 13 are provided with a voltage at a phase retarded from that of the frequency corresponding to the velocity of the vehicle. The more this phase angle is retarded the greater is the braking force. The theoretical maximum retardation is 90 electrical degrees.

An alternative acceleration feedback signal may be used instead of that from inertial-reference accelerometer 20. This is an acceleration signal derived from the relative acceleration of the mass (including motor 1) with respect to rail 2. Such a signal may be produced by a flux-sensing device in the magnetic circuit, such as a Hall-effect transducer. This is substituted for accelerometer 20 in the circuit.

This signal will not provide isolation of the mass from irregularities of the rail, but might be useful where the vehicle is to follow the rail quite closely for technical reasons, or where the greater cost of an inertial accelerometer is to be avoided.

Herein, specific circuit values, specific number of phases, and other specific data have been set forth for sake of clarity. However, specific circuit values may be altered by at least plus or minus 20 percent. The electrical equivalents of the integrated circuits and operational amplifiers may be used regardless of their size or other peripheral features.

Also, various ratios of feedback from the inertial (accelerometer) reference compared to gap-sensing reference may be used, depending upon the "stiffness" of the ride with respect to the rails that is desired.

I claim:

1. The method of suspending and moving a mass which includes the steps of;
   a. magnetically attracting said mass toward a a stationary element in the direction opposite to the direction of the attraction due to gravity
      to define a gap therebetween,
   b. regulating the magnitude of the magnetic attraction exerted upon said mass by nonlinear electrical feedback related to the attracted position of the mass, and
   c. electrically altering the magnetic configuration associated with said mass transverse to the direction of attraction due to gravity
      to longitudinally move the position of stable magnetic equilibrium for said mass with respect to said stationary element.

2. The method of claim 1 in which;
   a. the magnitude of magnetic attraction is regulated by sensing the vertical position of the mass and the acceleration of change of that position.

3. The method of claim 1 in which;
   a. the magnetic configuration is altered by changing the magnetization of at least a part of said mass by passing plural-phase alternating electric current through it.

4. The method of claim 1 in which;
   a. the alternating current feedback gain of said electrical feedback is substantially constant as a function of the attracted position of the mass.

5. The method of claim 3, including the step of;
   a. controlling the amplitude of said plural-phase alternating current as a function of its frequency,
      whereby the feedback gain may be maintained substantially constant notwithstanding changes in the frequency.

6. The method of claim 1, including the additional step of;
   a. regulating the magnitude of the magnetic attraction exerted upon said mass by control of said nonlinear feedback
      to provide lateral stability of said mass with respect to said stationary element.

7. Magnetic suspension apparatus comprising;
   a. a stationary ferromagnetic member (2),
   b. a movable ferromagnetic member (1), disposed below said stationary member and defining a gap between said members,
   c. an electrical circuit (4, 38) associated with said movable member to produce a magnetic flux across said gap,
   d. a first sensor element (22) responsive to the length of said gap,
   e. a second sensor element (20) responsive to motion of said movable member, and
   f. a nonlinear feedback circuit (24, 26) including said first and second sensor elements and connected to said electrical circuit for the electrical control of said electrical circuit over a wide range of length of said gap.

8. The apparatus of claim 7 in which;
   a. the magnetic flux across said gap is developed by alternating current applied to said electrical circuit, and
   b. the output of said feedback circuit is a direct current control voltage
      to control the magnitude of said alternating current.

9. The apparatus of claim 8 in which;
   a. said stationary member is an elongated rail, and
   b. said movable member includes means to shift the position of stable equilibrium along said rail.

10. The apparatus of claim 7, in which;
    a. said stationary ferromagnetic member is a rail having repetitive magnetic discontinuities, and
    b. said electrical circuit has plural paths (11, 12, 13) to carry plural-phase electric current
       to progressively alter the position of stable magnetic equilibrium of said movable member with respect to said rail for translating said movable member (1) along said rail.

11. The apparatus of claim 10 in which;
    a. said electrical circuit is wound (11, 12, 13) for plural phases of electricity, and
    b. said magnetic discontinuities are spaced to include a part of said electrical circuit which carries all of said plural phases.

12. The apparatus of claim 10 in which;
    a. the plurality of the plural-phase paths of said electrical circuit is three.

13. The apparatus of claim 7 in which;
    a. said stationary ferromagnetic member is a rail having discrete repetitive electrical paths, and
    b. said electrical circuit has plural paths (11, 12, 13) to carry plural-phase electric current,
       to induce electric current in said electrical paths for progressively altering the position of stable magnetic equilibrium of said movable member (1) with respect to said rail
       to translate said movable member along said rail.

14. The apparatus of claim 13 which includes;
    a. electrical discontinuity conductors (115) transverse to aid rail, and
    b. longitudinal shorting conductors (116, 117), the electrical conductivity of said conductors and said shorting conductors being greater than the transverse electrical conductivity of said rail.

15. The apparatus of claim 7, which additionally includes;
    a. a uniform electrical conductor (2''') substantially coextensive with and attached to the underside of said stationary ferromagnetic member (2) to lie within said gap,
       whereby said magnetic flux induces electric currents in said uniform electrical conductor
       to magnetically propel said movable ferromagnetic member (1) along said stationary ferromagnetic member.

16. The apparatus of claim 7, which additionally includes;
    a. further plural-phase windings (111, 112, 113) repetitively disposed along said stationary elongated ferromagnetic member (2),
    b. means to energize said further plural-phase windings with plural-phase electric current, and
    c. electrically reactive means to alter the phase of electric current flowing in said electrical circuit (4, 38)
       by induction from said further plural-phase windings from the phase of the electric current flowing in said further plural-phase windings,
       whereby electric power is transmitted from said further plural-phase windings to said electrical circuit.

17. The apparatus of claim 7 in which;
    a. said stationary ferromagnetic member (2) is magnetically uniform and homogeneous, is magnetically retentive, and exhibits magnetic hysteresis,
       whereby a longitudinal force is exerted upon said motor (1) upon electric current flowing through the electric circuit thereof.

18. The apparatus of claim 7 in which;
    a. said movable ferromagnetic member (1) is longitudinally laminated.

19. The apparatus of claim 7 in which
    a. said stationary ferromagnetic member (2) is longitudinally laminated.

20. The apparatus of claim 7, in which said nonlinear feedback circuit includes;
    a. an electrical element (24)
       having an electrical output proportional to a mathematical root of the electrical input thereto.

21. The apparatus of claim 7, in which said nonlinear feedback circuit includes;
    a. another electrical element (26)

having an electrical output proportional to a mathematical differential of the electrical input thereto.

22. The apparatus of claim 7, in which the nonlinear feedback circuit includes;
   a. an electrical integrator (58, 59, 61) connected to said first sensor element (22) responsive to the length of the gap,
   b. said integrator and also said second sensor element (20) responsive to acceleration
      connected to a first electrical element (24) having an electrical output proportional to a mathematical root of the electrical input thereto,
   c. the electrical output of said root element connected to a second electrical element (26) having an electrical output proportional to the mathematical differential of the electrical input thereto, and
   d. the output of said second electrical element connected to said electrical circuit (35, 36, 37, 38 4) associated with said movable ferromagnetic member (1) for the control of said electrical circuit.

23. The apparatus of claim 7, in which said electrical circuit includes;
   a. a variable frequency plural-phase oscillator (31)
      to originate alternating electrical energy for energizing said electrical circuit (38, 4)
      at a selected frequency corresponding to the desired velocity of translation of said movable ferromagnetic member (1).

24. The apparatus of claim 23, in which said electrical circuit additionally includes;
   a. an imperfect differentiator (32, 33 or 34) connected to each output phase circuit if said plural-phase oscillator (31),
      and to said electrical circuit (38, 4),
      to give an increasing voltage output with increasing frequency for overcoming the inductive reactance of said electrical circuit (4) associated with said movable ferromagnetic member (1).

25. The apparatus of claim 23, in which said electrical circuit additionally includes;
   a. plural electrical multipliers (35, 36, 37), each having,
   b. a first input circuit ($\phi$A, $\phi$B, $\phi$C) connected to an output phase circuit of said plural-phase oscillator (31),
   c. a second input circuit (Y) connected to said nonlinear feedback circuit, and
   d. an output circuit connected to said electrical circuit (38, 4)
      for energizing said electrical circuit proportional to the product of the electrical amplitudes derived from both said oscillator and said feedback circuit.

26. Magnetic suspension apparatus comprising;
   a. alternating current energized electromagnetic means for freely suspending a mass by magnetic attraction against the force of gravity acting thereon,
   b. sensing means carried by the mass for sensing movements thereof away from a reference position, and
   c. feedback means including said sensing means for regulating the magnitude of the alternating current energization in accordance with movements sensed by the sensing means
      to thereby restore the mass to its reference position over a range of frequency upwards from zero.

27. The apparatus of claim 26 wherein;
   a. the feedback means generates a direct current feedback voltage for control of the magnitude of the alternating current energization currents.

28. The apparatus of claim 27 wherein;
   a. said feedback voltage includes a control parameter to compensate for changes in the total weight of said mass
      to thereby restore the same to said reference position notwithstanding said changes in weight.

29. The apparatus of claim 27 wherein;
   a. the feedback voltage includes a control parameter responsive to the velocity of movement of the mass.

30. The apparatus of claim 27 wherein;
   a. the feedback voltage includes a control parameter responsive to the acceleration of movement of the mass.

31. The apparatus of claim 27 wherein;
   a. the feedback voltage includes a control parameter responsive to the displacement of the object from its reference position.

32. The apparatus of claim 27 wherein;
   a. the feedback voltage in response to said movements varies as the product of displacement of the mass from said reference position times the algebraic sum of
      1. the integral of said displacement,
      2. said displacement,
      3. the velocity of said movements, and
      4. the acceleration of said movements.

33. The apparatus of claim 32 wherein;
   a. said displacement is a dominant factor affecting the feedback voltage when the frequency of changes in displacement is in the range from DC to 1.2 hertz.

34. The apparatus of claim 32 wherein;
   a. said acceleration is a dominant factor affecting the feedback voltage when the frequency of changes in said displacement is in the range above 1.2 hertz.

* * * * *